United States Patent [19]

Meichsner et al.

[11] Patent Number: 5,147,926
[45] Date of Patent: Sep. 15, 1992

[54] CROSSLINKABLE AQUEOUS POLYURETHANE DISPERSIONS HAVING A LONG SHELF LIFE

[75] Inventors: Georg Meichsner, Lampertheim; Rainer Blum, Ludwigshafen, both of Fed. Rep. of Germany

[73] Assignee: BASF Lacke+Farben Aktiengesellschaft, Muenster, Fed. Rep. of Germany

[21] Appl. No.: 422,527

[22] Filed: Oct. 17, 1989

[30] Foreign Application Priority Data

Nov. 4, 1988 [DE] Fed. Rep. of Germany ....... 3837519

[51] Int. Cl.$^5$ .......................... C08J 3/205; C08J 3/24; C08L 75/00
[52] U.S. Cl. .................... 524/591; 524/501; 524/507; 524/839
[58] Field of Search ................. 524/591, 501, 507, 839

[56] References Cited

U.S. PATENT DOCUMENTS

| | | | |
|---|---|---|---|
| 3,320,196 | 5/1967 | Rogers | 524/72 |
| 4,356,275 | 10/1982 | Wagner et al. | 521/136 |
| 4,623,692 | 11/1986 | Hansen | 524/549 |
| 4,644,030 | 2/1987 | Loewrigreit et al. | 524/457 |
| 4,730,019 | 3/1988 | Hansen | 524/549 |
| 4,849,262 | 7/1989 | Uhl et al. | 524/507 |
| 4,983,662 | 1/1991 | Overbeek et al. | 524/501 |

FOREIGN PATENT DOCUMENTS

| | | |
|---|---|---|
| 0196164 | 10/1985 | European Pat. Off. . |
| 1495745 | 11/1969 | Fed. Rep. of Germany . |
| 1495745 | 11/1969 | Fed. Rep. of Germany . |
| 3536261 | 11/1988 | Fed. Rep. of Germany . |

Primary Examiner—John Kight, III
Assistant Examiner—Duc Troung
Attorney, Agent, or Firm—Keil & Weinkauf

[57] ABSTRACT

Crosslinkable aqueous polyurethane dispersions having a long shelf life contain

A) polyurethane which have carbonyl groups, are dispersed in water in the presence of ammonia or of organic amines and are obtainable by reacting
   a) organic polyisocyanates with
   b) compounds which contain one or more active hydrogen atoms and one or more salt groups or one or more groups capable of salt formation and
   c) carbonyl-containing mono- and/or polyalcohols and
   d) if desired chain extenders and
   e) if desired polyhydroxy compounds having molecular weights of from 500 to 8,000, and
B) polyhydrazides.

12 Claims, No Drawings

CROSSLINKABLE AQUEOUS POLYURETHANE DISPERSIONS HAVING A LONG SHELF LIFE

The present invention relates to crosslinkable aqueous polyurethane dispersions having a long shelf life and containing polyurethanes which have carbonyl groups and polyhydrazides, and their use for the preparation of printing inks.

Crosslinkable or self-crosslinking binder systems for water-dilutable finishes and printing inks are now available either as one-component systems or as two-component systems. Because of their reactivity, two-component systems often have only a limited shelf life, since either the crosslinking reaction slowly progresses or the crosslinking agent is consumed by reaction with water. On the other hand, one-component systems often have a long drying or curing time. Another frequent problem is poor resistance of the coating films to alkalis or acids, since the emulsifiers or the solubilizers incorporated in the resin, for example carboxylate, sulfonate or ammonium groups, make it possible for the coating film to undergo partial solution.

A possible method for crosslinking a water-soluble resin in a short time is, for example, to add salts containing polyvalent cations, this being described in European Patent 0,194,687 or U.S. Pat. No. 3,320,196. After the water has evaporated, the carboxyl groups of the binder form salts with the polyvalent cations, but alkali-resistant films are not generally formed.

Alkali-resistant and detergent-resistant films can be obtained if the solubility-imparting center in the binder participates in the crosslinking reaction and is consumed by reaction. This has been demonstrated by way of example for crosslinking with polyaziridines, which is described in European Patent 0,196,164.

The crosslinking of carbonyl-containing acrylate dispersions by bishydrazides is described in German Laid-Open Application DOS 3,536,261 and takes place very rapidly. However, acrylates have the disadvantage of poor film formation, and the films have poor gloss.

It is an object of the present invention to provide a water-based self-crosslinking binder formulation which is particularly suitable for printing inks for food packaging. Films of these coatings should rapidly become non-tacky and should have good adhesion to substrates, such as glass, aluminum foil, organic films, such as polyethylene, polypropylene, polyester or polyimide films, and uncoated and polyethylene-coated or polypropylene-coated cardboard or paper.

We have found that this object is achieved by a combination of a polyurethane having carbonyl groups and a polyhydrazide, which have a long shelf life in aqueous dispersions and crosslink after evaporation of water.

The present invention relates to crosslinkable aqueous polyurethane dispersions having a long shelf life and containing A) polyurethanes which have carbonyl groups, are dispersed in water in the presence of ammonia or of organic amines and are obtainable by reacting
  a) organic polyisocyanates with
  b) compounds which contain one or more active hydrogen atoms and one or more salt groups or one or more groups capable of salt formation and
  c) carbonyl-containing mono- and/or polyalcohols and
  d) if desired chain extenders and
  e) if desired polyhydroxy compounds having molecular weights of from 500 to 8,000, and B) polyhydrazides.

The present invention furthermore relates to the use of these binders for the preparation of printing inks.

Regarding the components, the following may be stated:

Suitable organic polyisocyanates a) are all aliphatic and aromatic diisocyanates, as described, for example, in Kunststoffhandbuch 7, Polyurethane, Carl-Hanser-Verlag 1983, pages 12-15 and 70. Isophorone diisocyanate and hexamethylene diisocyanate are preferably used.

Suitable compounds b) having one or more active hydrogen atoms and one or more salt groups or one or more groups capable of salt formation are known and are described in German Laid-Open Application DOS 1,495,745. Aliphatic and aromatic mono- and polycarboxylic acids are preferably used, for example dihydroxycarboxylic acids, such as 2,2-dimethylolpropionic acid, hydroxycarboxylic acids, such as hydroxypivalic acid or hydroxybenzoic acid, hydroxydicarboxylic acids, such as 2-hydroxysuccinic acid, or dihydroxydicarboxylic acids, such as tartaric acid, or mono- or polyhydroxysulfonic acids. 2,2-Dimethylpropionic acid and tartaric acid are particularly preferably used.

Owing to these acid groups, the polyurethanes are dispersible in water after neutralization with ammonia or tertiary amines.

Component b) is used in an amount such that the polyurethanes A) have an acid number of from 10 to 100, preferably from 10 to 50, mg of KOH/g.

Suitable carbonyl-containing mono- and/or polyalcohols c) are, for example, hydroxyacetone, hydroxybenzaldehyde, acetoin and benzoin.

Adducts of diepoxides and ketocarboxylic acids are also suitable. Preferred diepoxides are glycidyl ethers of bisphenols, such as 2,2-bis-(4-hydroxyphenyl)-propane (bisphenol A), 4,4'-dihydroxybenzophenone, 1,1-bis-(4-hydroxyphenyl)-ethane, 1,1-bis-(4-hydroxyphenyl)-isobutane, 2,2-bis-(4-hydroxy-tert-butylphenyl)-propane, bis-(4-hydroxynaphthyl)-methane and 1,5-dihydroxynaphthalene.

Diglycidyl ethers of dihydric alcohols, for example of ethylene glycol, diethylene glycol, triethylene glycol, 1,2-propylene glycol, 1,3-propanediol, 1,5-pentanediol, 1,6-hexanediol and 2,2-bis-(4-hydroxycyclohexyl)-propane, are also suitable. It is also possible to use diglycidyl esters of dicarboxylic acids. Oxalic acid, succinic acid, glutaric acid, terephthalic acid, 2,6-naphthalenedicarboxylic acid and dimerized linolenic acid are preferably used. Typical examples are glycidyl adipate and glycidyl phthalate.

Suitable ketocarboxylic acids are pyruvic acid and levulinic acid. Levulinic acid is preferably used.

Other suitable components c) are ketocarboxylates which are obtainable by partial esterification of ketocarboxylic acids with polyalcohols or by partial transesterification of ketocarboxylates with polyalcohols (partial esters). These esters also have one or more, preferably two, hydroxyl groups. Partial esters, such as pyruvates, acetoacetates, levulinates or mixtures thereof, whose alcohol components are aliphatic polyalcohols, such as the diols ethylene glycol, diethylene glycol or 1,6-hexanediol or the polyols glycerol, trimethylolpropane, trimethylolethane, pentaerythritol or sorbitol, are suitable.

Esters of levulinic acid with triols having two hydroxyl groups are preferred.

Further suitable components c) are ketocarboxylates of polyesterpolyols which also have one or more, preferably two, hydroxyl groups. The components of such polyesterpolyols are known and are described in Kunststoff-Handbuch, pages 42–61, cited above, and are obtainable, for example, by esterification of succinic acid, adipic acid or phthalic acid with triols, such as glycerol or trimethylolpropane and/or diols, such as butanediol or hexanediol, or polytetrahydrofuran having a mean molecular weight $M_n$ of 1,000.

The polyesterpolyols have mean molecular weights $M_n$ of from 400 to 10,000, preferably from 500 to 8,000, and functionalities of from 2 to 8, preferably from 3 to 4. The ketocarboxylates which are suitable as component c) and furthermore have one or more, preferably two, hydroxyl groups are obtainable by transesterification of, for example, pyruvates, acetoacetates or levulinates with these polyesterpolyols. Here too, levulinates having a hydroxyl functionality of 2 are preferred.

It is of course also possible to use mixtures of the carbonyl-containing mono- and/or polyalcohols as component c).

Component c) is used in an amount such that the carbonyl content of the polyurethane A) is from 0.1 to 2.2, preferably from 0.6 to 1.5, moles of CO per 1,000 g.

If desired, conventional chain extenders, as described, for example, in Kunststoff-Handbuch, pages 18, 99 and 100, cited above, may be present as component d). When these are present, butanediol, hexanediol and hexamethylenediamine are preferred.

Polyhydroxy compounds e) having molecular weights of from 500 to 8,000, as described in, for example, the abovementioned Kunststoff-Handbuch, pages 42–61, may also be present. When they are present, polyesterpolyols and polyetherpolyols are preferred.

The polyurethanes are prepared by the known polyaddition processes, by reacting components a) to c) and, if required, e) and f) stepwise or in a one-shot process. The components are used in amounts such that the molar ratio of isocyanate groups to active hydrogen atoms is from 1:0.8 to 1:1.2, preferably from 1:0.9 to 1:1.1. The polyurethanes may also contain urea groups if either primary or secondary amines are present or if an excess of NCO groups is used and the product is subsequently dispersed in water.

The polyurethanes are dispersed in water in the presence of ammonia or organic amines, such as trialkylamines, e.g. trimethylamine or triethylamine, or hydroxyalkylamines, e.g. trishydroxyethylamine, or mixtures thereof. The amine may be added to the polyurethane or to the water before or during the dispersing process. Polyhydrazides of organic dicarboxylic acids are added to the aqueous dispersions so that the ratio of the number of equivalents of carbonyl groups of the polyurethanes A) to those of the polyhydrazides B) is from 0.1:1 to 1.1:1, preferably from 0.5:1 to 1.1:1.

The polyhydrazides are known and are described in, for example, German Laid-Open Application DOS 3,536,261. Adipic acid bishydrazide, succinic acid bishydrazide and phthalic acid bishydrazide are preferably used.

Conventional pigments, assistants, such as waxes, lubricants and pigment dispersants, and/or additives, such as thickeners, thixotropic agents and antifoams, may furthermore be added to the aqueous dispersions.

After the aqueous dispersions have been applied to substrates of glass, aluminum foil, organic films, such as polyethylene, polypropylene, polyester or polyimide films or to uncoated or polyethylene-coated or polypropylene-coated cardboard or paper, rapidly drying films which crosslink immediately are formed. They have good gloss, good resistance to acids, alkalis and detergents and excellent adhesion to films and good abrasion resistance.

EXAMPLE

Preparation of a Polyurethane Dispersion

In a 2 l reactor, 150.3 g (0.677 mole) of isophorone diisocyanate were added dropwise to a mixture of 200 g (0.436 equivalent) of a CO-functionalized polyester, 112.4 g (0.186 mole) of an adduct of 2 moles of levulinic acid and 1 mole of bisphenol A diglycidyl ether, 7.4 g (0.100 mole) of hydroxyacetone, 29.86 g (0.223 mole) of dimethylolpropionic acid and 22.5 g of triethylamine under a nitrogen atmosphere at from 80° to 120° C., while stirring. As soon as the NCO content reached less than 1% by weight of NCO per 1,000 g, water was added. Preparation of a clear coat 60.0 g (0.345 mole) of adipic acid bishydrazide were added to the polyurethane dispersion described above and the mixture was diluted with water until the viscosity obtained corresponded to an efflux time of 30 sec in a 4 mm Ford cup. Preparation of a printing ink 500 g of blue pigment and 5 g of polyethylene wax were added to the clear coat described above, thorough dispersing was carried out and the mixture was then diluted with water to an efflux time of 14 sec in a 4 mm Ford cup.

Prints obtained with the printing inks prepared in this manner on polyethylene film were resistant to acids and alkalis according to DIN 16,524.

I claim:

1. A crosslinkable aqueous polyurethane dispersion having a long shelf life which comprises:
    A) polyurethanes which have carbonyl groups, are dispersed in water in the presence of ammonia or of organic amines and are obtained by reacting
        a) organic polyisocyanates with
        b) compounds which contain one or more active hydrogen atoms and one or more salt groups or one or more groups capable of salt formation and
        c) carbonyl-containing mono- and/or polyalcohols, and
    B) polyhydrazides.

2. A dispersion as defined in claim 1, containing a polyurethane obtained by using mono- or dihydroxycarboxylic acids, hydroxydicarboxylic acids, mono- or dihydroxysulfonic acids or a mixture thereof as component b).

3. A dispersion as defined in claim 1, containing a polyurethane obtained by using hydroxyacetone, hydroxybenzaldehyde, acetoin, benzoin or a mixture thereof as component c).

4. A dispersion as defined in claim 1, containing a polyurethane obtained by using reaction products of diepoxides and ketocarboxylic acids and/or ketocarboxylates of trialcohols and/or ketocarboxylates of polyesterpolyols as component c).

5. A dispersion as defined in claim 1, containing a bishydrazide of an organic dicarboxylic acid as component B).

6. A dispersion as defined in claim 1, containing a polyurethane A) and a polyhydrazide B) in amounts such that the ratio of the number of equivalents of carbonyl groups of the polyurethane A) to those of the polyhydrazide B) is from 0.1:1 to 1.1:1.

7. A dispersion as defined in claim 1, additionally containing pigments, assistants and/or additives.

8. A process for the preparation of a crosslinkable aqueous polyurethane dispersion having a long shelf life, which comprises:
 a) reacting organic polyisocyanates with
 b) compounds which contain one or more active hydrogen atoms and one or more salt groups or one or more groups capable of salt formation, and with
 c) carbonyl-containing mono- and/or polyalcohols in a molar ratio of isocyanate groups to active hydrogen atoms of from 1:08 to 1:1.2, dispersing the product in water in the presence of ammonia or an organic amine, and adding a polyhydrazide to this dispersion.

9. A printing ink obtainable using a dispersion as claimed in claim 1.

10. A crosslinkable dispersion as defined in claim 1 which further includes chain extenders.

11. A crosslinkable dispersion as defined in claim 1 which further includes polyhydroxy compounds having molecular weights of from 500 to 8000.

12. A crosslinkable dispersion as defined in claim 1 which further includes chain extenders and polyhydroxy compounds having molecular weights of from 500 to 8000.

* * * * *